United States Patent
Ohashi

(10) Patent No.: US 10,679,589 B2
(45) Date of Patent: Jun. 9, 2020

(54) IMAGE PROCESSING SYSTEM, IMAGE PROCESSING APPARATUS, AND PROGRAM FOR GENERATING ANAMORPHIC IMAGE DATA

(71) Applicant: SONY INTERACTIVE ENTERTAINMENT INC., Tokyo (JP)

(72) Inventor: Yoshinori Ohashi, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/300,306

(22) PCT Filed: Feb. 16, 2017

(86) PCT No.: PCT/JP2017/005743
§ 371 (c)(1),
(2) Date: Nov. 9, 2018

(87) PCT Pub. No.: WO2017/199495
PCT Pub. Date: Nov. 23, 2017

(65) Prior Publication Data
US 2019/0122643 A1   Apr. 25, 2019

(30) Foreign Application Priority Data

May 20, 2016   (JP) ................. 2016-101638

(51) Int. Cl.
*G09G 5/391*   (2006.01)
*G09G 5/36*   (2006.01)
(Continued)

(52) U.S. Cl.
CPC ......... *G09G 5/391* (2013.01); *G02B 27/0172* (2013.01); *G06F 3/14* (2013.01);
(Continued)

(58) Field of Classification Search
CPC ..................................................... G09G 5/391
(Continued)

(56) References Cited

U.S. PATENT DOCUMENTS

2004/0227703 A1* 11/2004 Lamvik ............. G02B 27/0172
345/76
2013/0222384 A1* 8/2013 Futterer ................. G02B 5/32
345/426

FOREIGN PATENT DOCUMENTS

| JP | 9-9253 A | 1/1997 |
| JP | 2010-283567 A | 12/2010 |
| WO | 2016/063617 A1 | 4/2016 |

OTHER PUBLICATIONS

Notification of Reason for Refusal dated Jun. 11, 2019, from Japanese Patent Application No. 2018-518083; 12 sheets.
(Continued)

*Primary Examiner* — Shivang I Patel
(74) *Attorney, Agent, or Firm* — Katten Muchin Rosenman LLP

(57) ABSTRACT

An image processing apparatus that is connected to a display apparatus generates image data to be displayed, that is, anamorphic image data in which each pixel of the image data to be displayed on the display apparatus is rearranged into an array such that as a distance from a center of a display section is shorter, density of the pixels is higher, the array being different from a pixel array in the display section, and outputs the generated anamorphic image data.

10 Claims, 5 Drawing Sheets

(51) Int. Cl.
  *G06T 3/00*    (2006.01)
  *G06F 3/14*    (2006.01)
  *G09G 5/00*    (2006.01)
  *G02B 27/01*   (2006.01)
  *G06T 3/40*    (2006.01)
  *G06T 5/00*    (2006.01)

(52) U.S. Cl.
  CPC .............. *G06T 3/0093* (2013.01); *G06T 3/40* (2013.01); *G06T 5/006* (2013.01); *G09G 5/00* (2013.01); *G09G 5/36* (2013.01); *G02B 2027/011* (2013.01); *G02B 2027/014* (2013.01); *G02B 2027/0123* (2013.01); *G09G 2340/0407* (2013.01)

(58) Field of Classification Search
  USPC ........................................................ 345/428
  See application file for complete search history.

(56) References Cited

OTHER PUBLICATIONS

International Search Report and Written Opinion completed Apr. 4, 2017, from International Application No. PCT/JP2017/005743, 7 sheets.
International Preliminary Report on Patentability dated Nov. 20, 2018, from International Application No. PCT/JP2017/005743, 14 sheets.

\* cited by examiner

F I G . 2
(A)
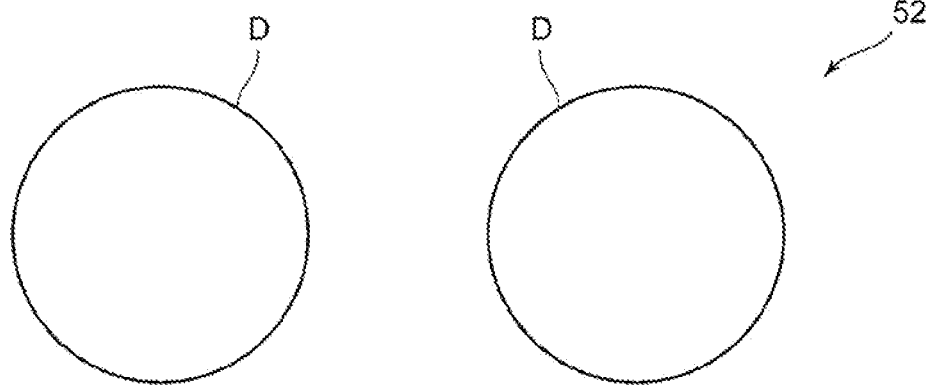
(B)
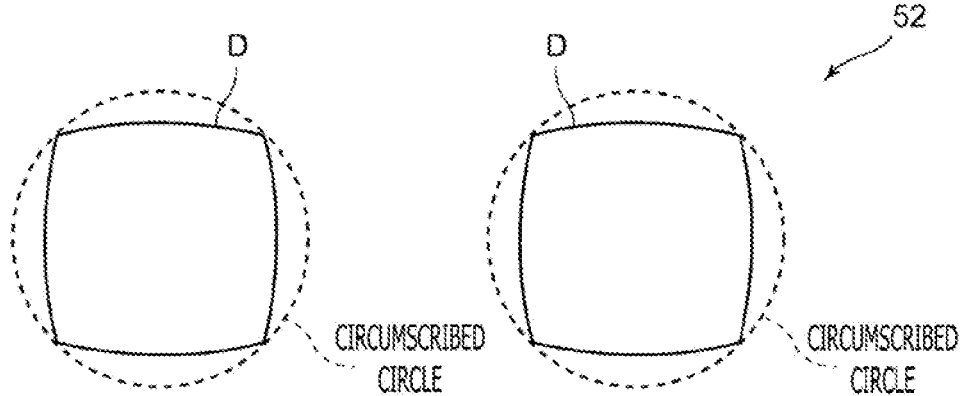
(C)
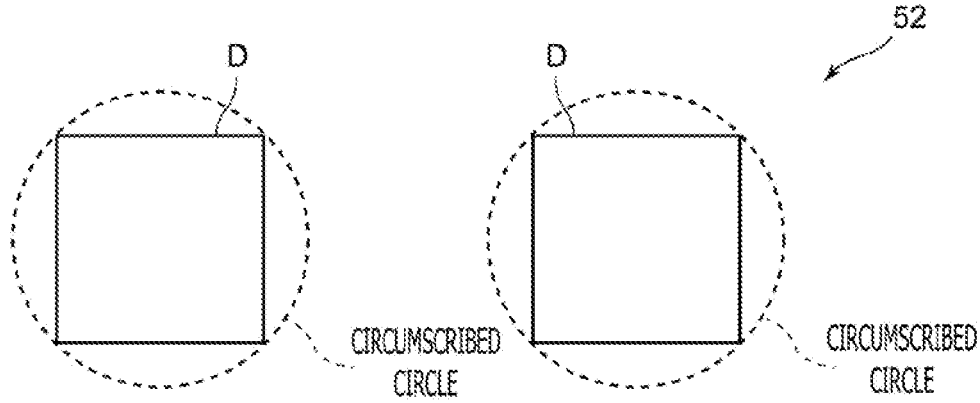

IMAGE PROCESSING SYSTEM, IMAGE PROCESSING APPARATUS, AND PROGRAM FOR GENERATING ANAMORPHIC IMAGE DATA

TECHNICAL FIELD

The present invention relates to an image processing system including a display apparatus, an image processing apparatus that is connected to the display apparatus worn on a head of a user, and a program.

BACKGROUND ART

In recent years, a display apparatus worn on the head and used by the user, such as a head-mounted display is widely used. The above display apparatus receives image data to be displayed from a home game device, a PC (Personal Computer), or the like. Further, by imaging an image expressed by this image data in front of eyes of the user, the user is allowed to browse the image. Further, in recent years, resolution of an image to be displayed by the display apparatus becomes higher increasingly. Along with this, even a data amount of the image data sent from a home game device etc. to the display apparatus is increasing.

SUMMARY

Technical Problem

To solve the above problem, there is desired a data amount reduction technique for reducing the data amount of image data to be transmitted while allowing the user to visually recognize a high-definition image.

The present invention has been made in view of such a subject as described above, it is an object of the present invention to provide an image processing system, an image processing apparatus, and a program that are capable of reducing the data amount of image data to be transmitted while allowing the user to visually recognize a high-definition image.

Solution to Problem

The present invention for solving the above problem of the conventional example includes an image processing apparatus that is connected to a display apparatus. The image processing apparatus includes: image generation means for generating image data to be displayed and generating anamorphic image data in which each pixel of the image data displayed on the display apparatus is rearranged into an array such that as a distance from a center of a display section is shorter, density of the pixels is higher, the array being different from a pixel array in the display section of the display apparatus; and output means for outputting the generated anamorphic image data.

BRIEF DESCRIPTION OF DRAWINGS

FIG. 2 is a schematic diagram illustrating shape examples of display sections of a display apparatus of the image processing system according to the embodiment of the present invention.

DESCRIPTION OF EMBODIMENT

Hereinafter, a configuration example in which image data processed by an image processing apparatus according to an embodiment of the present invention is displayed on a display apparatus worn on a head of a user will be described. On the basis of optical characteristics of the display apparatus, as a field-of-view angle is more broadened, resolution is relatively higher in a central portion of the displayed image and the resolution is relatively lower in a peripheral portion thereof. Further, it is known that an effective field of view (range in which high resolution is needed) of human's eyes is needed only at a place near to a field-of-view center part and even if the resolution of a field-of-view peripheral part is relatively low, there is no problem in recognition.

Figure 1:
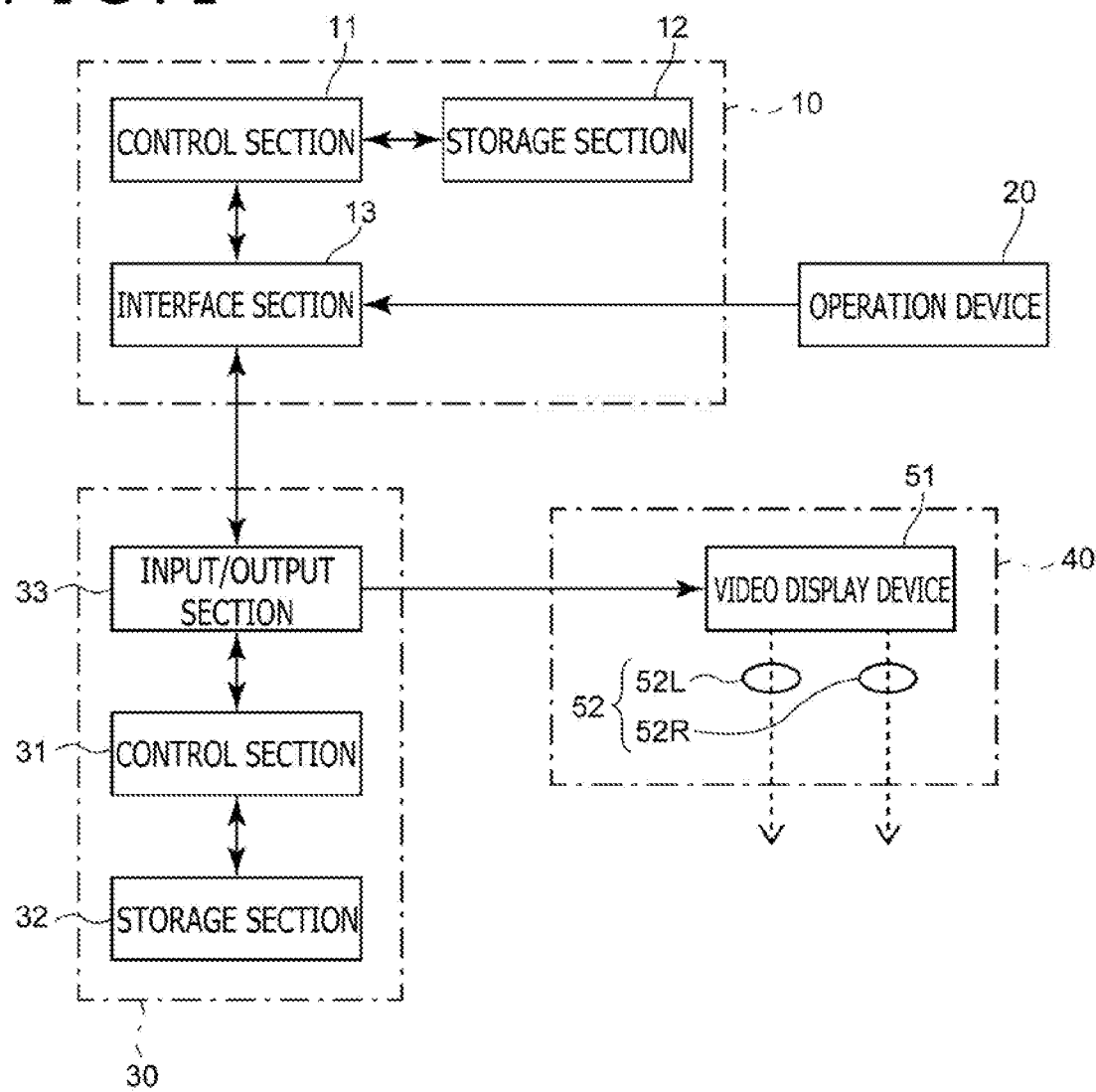
FIG. 1 is a block diagram illustrating a configuration example of an image processing system according to an embodiment of the present invention.

The embodiment of the present invention will be described with reference to the accompanying drawings. An image processing system 1 including an image processing apparatus 10 according to the embodiment of the present invention includes the image processing apparatus 10, an operation device 20, a relay control apparatus 30, and a display apparatus 40, as illustrated in FIG. 1.

The image processing apparatus 10 is an apparatus that supplies image data representing an image to be displayed by the display apparatus 40. Examples of the image processing apparatus 10 include a home game device, a portable game machine, a personal computer, a smartphone, a tablet, and the like. As illustrated in FIG. 1, the image processing apparatus 10 includes a control section 11, a storage section 12, and an interface section 13.

The control section 11 is a program control device such as a CPU (Central Processing Unit) and executes a program stored in the storage section 12. In the present embodiment, the control section 11 generates anamorphic image data obtained by converting a pixel array of the image data representing an image displayed on the display apparatus 40. Then, the control section 11 performs processing for outputting the generated anamorphic image data to the display apparatus 40 on the anamorphic image data. Contents of the anamorphic image data and detailed operations of the control section 11 are described below.

The storage section 12 includes at least one memory device such as a RAM (Random Access Memory) and stores a program executed by the control section 11. In addition, the storage section 12 operates also as a work memory of the control section 11 and stores data used in the process of executing the program by the control section 11. The program may be stored in a computer readable and non-transitory storage medium and provided or may be stored in the storage section 12.

The interface section 13 is an interface for performing data communication by the control section 11 of the image processing apparatus 10 between the operation device 20 and the relay control apparatus 30. The image processing apparatus 10 is connected to the operation device 20, the relay control apparatus 30, and the like through any of a wired line and a radio channel via the interface section 13. As one example, in order to transmit the anamorphic image data or audio supplied by the image processing apparatus 10 to the relay control apparatus 30, the interface section 13 may include a multimedia interface such as an HDMI (registered trademark) (High-Definition Multimedia Interface). In addition, the interface section 13 may include a data communication interface such as a USB (Universal Serial Bus) in order to receive various types of information from the display apparatus 40 or transmit a control signal etc. via the relay control apparatus 30. Further, the interface section 13 may include a data communication interface such as a USB in order to receive a signal indicating contents of an operation input of the user to the operation device 20.

The operation device 20 is a controller etc. for a home game device and is used to perform various instruction operations to the image processing apparatus 10 by the user. Contents of the operation input of the user to the operation device 20 are transmitted to the image processing apparatus 10 through any of a wired line and a radio channel. Note that, the operation device 20 need not necessarily be separated to the image processing apparatus 10 and may include an operation button, a touch panel, or the like arranged on a housing surface of the image processing apparatus 10.

The relay control apparatus 30 is connected to the display apparatus 40 and receives the anamorphic image data supplied from the image processing apparatus 10. Then, the relay control apparatus 30 generates image data in which the input anamorphic image data is rearranged into a pixel array of display sections D in a video display device 51 of the display apparatus 40, which is described below. Further, if necessary, the relay control apparatus 30 performs processing or the like for correcting a distortion caused by an optical system of the display apparatus 40 on an image represented by the supplied image data and outputs a video signal representing the corrected image. Contents of specific operations of the relay control apparatus 30 are described below.

Note that the video signal output from the relay control apparatus 30 to the display apparatus 40 includes two video signals of a left-eye video signal and a right-eye video signal. Further, in addition to video signals, the relay control apparatus 30 relays various types of information transmitted and received between the image processing apparatus 10 and the display apparatus 40, such as audio data or control signals.

The display apparatus 40 is a display device worn on the head and used by the user. Further, the display apparatus 40 displays a video according to the video signals input from the relay control apparatus 30 and allows the user to browse the video. In the present embodiment, the display apparatus 40 is assumed to display respective videos corresponding to the eyes in front of the respective eyes of the right eye and the left eye of the user. As illustrated in FIG. 1, the display apparatus 40 includes the video display device 51 and optical devices 52.

The video display device 51 is an organic EL (Electroluminescence) display panel, a liquid crystal display panel, or the like and displays a video in accordance with the video signal input from the relay control apparatus 30. The video display device 51 may be one display device that displays a left-eye video and right-eye video arrayed in a line or include a pair of display devices that each display the left-eye video and the right-eye video independently. In the present embodiment, portions in which the left-eye video and the right-eye video are displayed correspond to the respective display sections of the present invention. In an example according to the present embodiment, as illustrated in FIG. 2, the display sections D that are the portions on which the left-eye video and the right-eye video are displayed each may have circular forms with a radius R (FIG. 2(A)) and pixels may be arrayed in a grid pattern within a range of the circular form. In addition, each display section D may be obtained by arraying pixels in a rectangular grid pattern within a rectangle (FIG. 2(B)) in which each side is convexed to the outside. Further, each display section D may be obtained by arraying pixels in a rectangular grid pattern within the rectangle (FIG. 2(C)). When each display section D has a shape other than a circular form, the center of the circle may be set to the center of a circumscribed circle (set to a radius R) of the shape of each display section D. Further, a display screen of a smartphone etc. may be directly used as the video display device 51. In this case, the smartphone etc. display a video in accordance with the video signal input from the relay control apparatus 30. Further, the display apparatus 40 may be a retina irradiation type (retina projection type) apparatus that directly projects a video on retinas of the user. In this case, the video display device 51 may include laser that emits light, an MEMS (Micro Electro Mechanical Systems) mirror that scans the light, and the like.

The optical devices 52 are holograms, prisms, half mirrors, or the like and are arranged in front of the user's eyes to transmit or refract video light displayed by the video display device 51 and allow the light to be incident on the user's eyes. Specifically, the optical devices 52 may include a left-eye optical device 52L and a right-eye optical device 52R. In this case, the left-eye video displayed by the video display device 51 may be allowed to be incident on the user's left eye via the left-eye optical device 52L. Further, the right-eye video displayed by the video display device 51 may be allowed to be incident on the user's right-eye via the right-eye optical device 52R. Through this process, in the state in which the display apparatus 40 is worn on the head, the user can view the left-eye video and the right-eye video by the left eye and the right eye, respectively. Note that, in the present embodiment, the display apparatus 40 is assumed to be a non-transmission-type display apparatus incapable of visually recognizing external situations by the user.

Figure 3:
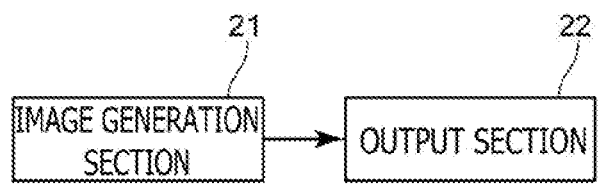
FIG. 3 is a functional block diagram illustrating an example of an image processing apparatus according to the embodiment of the present invention.

Next, operations of the control section 11 of the image processing apparatus 10 are described. In the present embodiment, as illustrated in FIG. 3, the control section 11 functionally includes an image generation section 21 and an output section 22. The image generation section 21 generates image data to be displayed. Specifically, the image generation section 21 generates the anamorphic image data in which each pixel in each display section D of the display apparatus 40 is rearranged into an array such that as a distance from the center of each display section D is shorter, density of pixels is higher in the video display device 51, which is different from a pixel array of the portion (display section) in which the left-eye video or the right-eye video is displayed.

Figure 4:
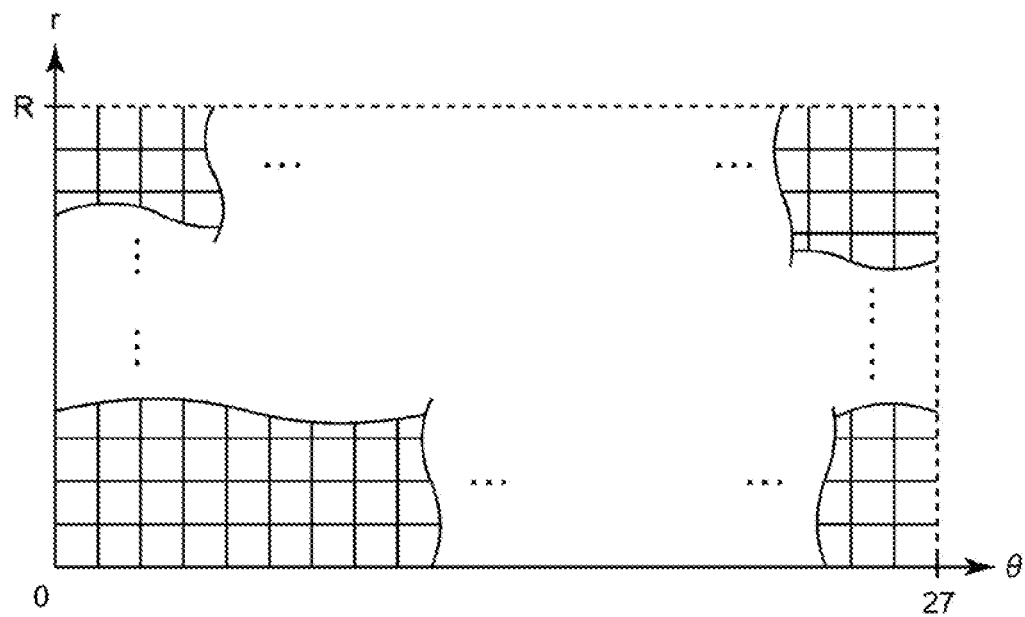
FIG. 4 is a schematic diagram illustrating a pixel array example of anamorphic image data generated by the image processing apparatus according to the embodiment of the present invention.

Specifically, as illustrated in FIG. 4, the anamorphic image data is represented by pixels that are arranged in a grid pattern within a coordinate system having a first axis r and a second axis θ to be intersected with each other. In an example according to the present embodiment, the first axis r and the second axis θ are orthogonalized to each other. An anamorphic pixel array of the anamorphic image data generated by the image generation section 21 is obtained by arraying along the first axis r (at least in a range of r≤R) a series of pixels arrayed and displayed in a moving radius direction from the center of the display apparatus 40 and by arraying along the second axis θ within the coordinate system a series of pixels arrayed and displayed in an angular direction (from θ to 2 π (radian)) in the display apparatus 40. Hereinafter, the array of the pixels is referred to as the "anamorphic pixel array."

That is, the array is obtained by mapping each pixel within a circle circumscribed with each display section D arrayed within a polar coordinate system onto an X and Y orthogonal coordinate system. Further, as N pieces of pixels are more arrayed along the θ axis, density of the pixels in a peripheral direction is higher in the center (r is small). By contrast, as N pieces of pixels are more arrayed along the θ axis, density of the pixels in the peripheral direction is lower (because a peripheral length becomes long) at the outside (r is large). The reason is that a spacing between the pixel and an adjacent pixel is 2 πr/N and becomes large in proportion to r. In this manner, the pixel array illustrated in FIG. 4 is an array such that as a distance from the center of each display section is shorter, the density of the pixels becomes higher. As described above, when the array is an array such that as the distance from the center of each display section is shorter, the density of the pixels is higher, the first axis r and the second axis θ need not necessarily be orthogonalized to each other.

The image generation section 21 receives shape data regarding three-dimensional objects, data indicating arrangement positions, data regarding positions and directions of virtual light, and data regarding positions and line-of-sight directions of virtual cameras and performs rendering processing (processing for determining a pixel value for each pixel within a field of view of the virtual camera) by a widely known method. At this time, the image generation section 21 arrays pixels in which the pixel value is determined and generates the anamorphic image data in the anamorphic pixel array illustrated in FIG. 4. The image generation section 21 performs the processing on both the left-eye anamorphic image data and the right-eye anamorphic image data and obtains a plurality of pieces of the anamorphic image data to output the data to the output section 22. The output section 22 receives the anamorphic image data (both the left-eye anamorphic image data and the right-eye anamorphic image data) generated by the image generation section 21 and outputs the data to the relay control apparatus 30.

Further, as illustrated in FIG. 1, the relay control apparatus 30 includes a control section 31, a storage section 32, and an input/output section 33. The control section 31 is a program control device such as a CPU and executes a program stored in the storage section 12. In the present embodiment, the control section 31 receives the anamorphic image data supplied from the image processing apparatus 10, generates the image data that is rearranged into a pixel array of each display section D in the video display device 51 of the display apparatus 40, and performs processing for outputting a video signal represented by the image data. Further, when audio data or a control signal is input from the image processing apparatus 10, the control section 31 sends the data, the control signal, or the like to the display apparatus 40. In addition, the control section 31 sends the data received from the display apparatus 40 to the image processing apparatus 10. Contents of operations of the control section 31 are described below.

The storage section 32 includes at least one memory device such as a RAM and stores a program executed by the control section 31. Further, the storage section 32 operates also as a work memory of the control section 31 and stores data used in the process of executing the program by the control section 31. The program may be stored and provided in a computer readable and non-transitory storage medium or may be stored in the storage section 32.

The input/output section 33 receives the anamorphic image data or audio supplied from the image processing apparatus 10 through any of a wired line and a radio channel. Further, the input/output section 33 outputs a video signal to the video display device 51 of the display apparatus 40 and allows the video display device 51 to display a video.

Figure 5:
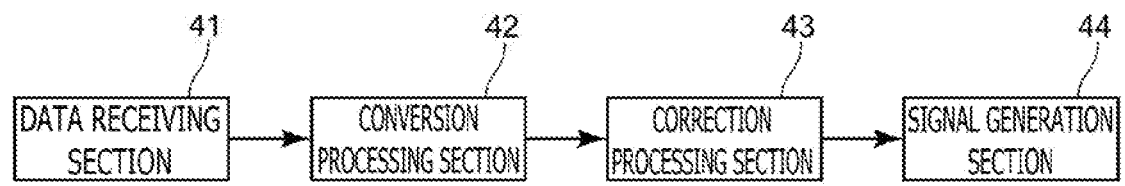
FIG. 5 is a functional block diagram illustrating an example of a relay control apparatus that is connected to the image processing apparatus according to the embodiment of the present invention.

Here, operations of the control section 31 of the relay control apparatus 30 are described. As illustrated in FIG. 5, the control section 31 functionally includes a data receiving section 41, a conversion processing section 42, a correction processing section 43, and a signal generation section 44.

The data receiving section 41 receives the anamorphic image data supplied from the image processing apparatus 10 and outputs the anamorphic image data to the conversion processing section 42. The conversion processing section 42 converts the anamorphic image data output by the image processing apparatus 10 into image data having a pixel array in each display section D of the video display device 51. Specifically, the conversion processing section 42 selects each pixel (here, each pixel is assumed to be arrayed in a grid pattern within the X and Y orthogonal coordinate system) arrayed in each display section D (portion for displaying the left-eye video or the right-eye video) of the video display device 51 in a predetermined order. This order may be, for example, a scan line order. Specifically, using as a line a series of pixels arrayed in an X-axis direction, each pixel may be selected in sequence up to pixels in the lower right corner of each display section D so that a pixel is selected from left to right in a line in sequence from the uppermost line in each display section D and then a pixel is selected from left to right in a line in the next line below, and the like.

The conversion processing section 42 obtains a value (rn, θn) in which the center of the selected pixel is represented by the polar coordinate system using the center of each display section D as the center. Then, the conversion processing section 42 searches the anamorphic image data for a pixel nearest to the coordinates (rn, θn) obtained here. In the result of the searching, the conversion processing section 42 sets a pixel value of the found pixel to a pixel value of the selected pixel. Note that, as an example, processing is performed by using the pixel value of the pixel nearest to the coordinates (rn, θn) obtained here; however, the present embodiment is not limited thereto. Further, the conversion processing section 42 may fix a pixel value of the selected pixel by widely known processing in a coordinate conversion of the image data such as processing using an average pixel value of a plurality of pixels near to the coordinates (rn, θn) obtained here. Through this process, the conversion processing section 42 fixes a pixel value of each pixel in each display section D (portion for displaying the left-eye video or the right-eye video) of the video display device 51 and generates image data (referred to as display image data) corresponding to the pixel array in each display section D.

The correction processing section 43 performs processing for correcting a distortion caused by the optical system of the display apparatus 40 on the left-eye display image data and the right-eye display image data. The processing is, for example, processing for correcting a barrel-type distortion or the like. Further, widely known correction processing of the image data may be arbitrarily combined and used in accordance with the optical system of the display apparatus 40, and therefore detailed descriptions are omitted here.

The signal generation section 44 receives the display image data (the left-eye display image data and the right-eye display image data) corrected by the correction processing section 43 and generates the left-eye video signal and the right-eye video signal. The video signal is, for example, based on a format of the video signal of the above-described HDMI and the widely known processing may preferably be adopted as processing for generating the video signal from the image data.

Figure 6:
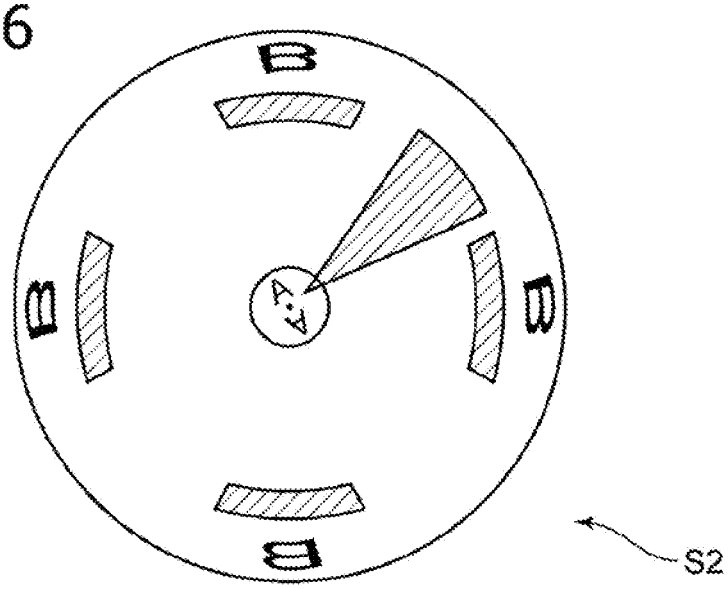
FIG. 6 is a schematic diagram illustrating an operation example of the image processing system according to the embodiment of the present invention.
Figure 6:
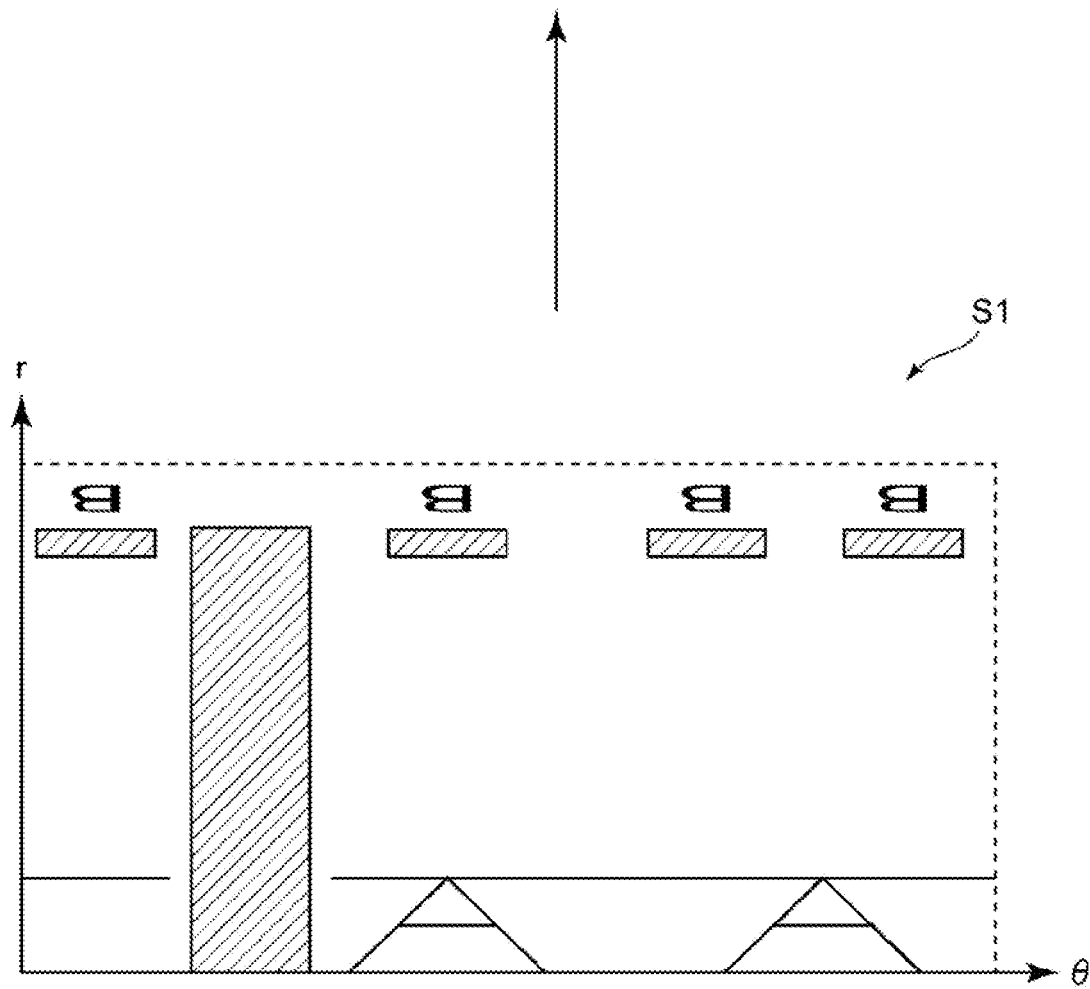

The image processing apparatus 10 according to the present embodiment includes the above-described configuration and operates as described below. In the processing process of a game program, for example, the image processing apparatus 10 performs the rendering processing by using shape data regarding three-dimensional objects appearing in a game, data indicating its arrangement position, data regarding positions and directions of virtual light, and data regarding positions and directions (the positions and directions are set to positions and directions different from each other in the left-eye processing and the right-eye processing) of virtual cameras. At this time, in each display section D of the display apparatus 40, the image processing apparatus 10 arrays a series of pixels arrayed and displayed in the moving radius direction from the center along the first axis r. Further, the image processing apparatus 10 secures two pieces of left-eye storage area and right-eye storage area of the image data obtained by arraying a series of N pieces (N>1) of pixels arrayed and displayed in an angular direction (from 0 to 2 $\pi$ (radian)) in each display section D of the display apparatus 40 along the second axis θ orthogonalized to the first axis r. Then, a pixel value of each pixel in the left-eye image data secured here is determined by using the left-eye rendering processing. In the same manner, a pixel value of each pixel in the right-eye image data is determined by using the right-eye rendering processing. This process permits the image processing apparatus 10 to obtain the left-eye anamorphic image data and the right-eye anamorphic image data in the anamorphic pixel array as illustrated in FIG. 4 (FIG. 6 (S1)). Note that, in FIG. 6, for convenience of description, only one of the left-eye image data and the right-eye image data is indicated.

The image processing apparatus 10 outputs the anamorphic image data to the relay control apparatus 30. The relay control apparatus 30 receives the anamorphic image data supplied from the image processing apparatus 10 and converts the anamorphic image data into the display image data having the pixel array in each display section D of the display apparatus 40 (FIG. 6 (S2)). In an example according to the present embodiment, pixels are assumed to be arrayed in a grid pattern within the X and Y orthogonal coordinate system in each display section D of the display apparatus 40. The relay control apparatus 30 selects each pixel in the display section D that displays the left-eye video of the display apparatus 40 in the scan line order and obtains the value (rn, θn) in which the center of the selected pixel is represented by the polar coordinate system using the center of the display section D as the center. Then, the relay control apparatus 30 searches the left-eye anamorphic image data for the pixel nearest to the coordinates (rn, θn) obtained here, and in the result of the searching, sets a pixel value of the found pixel to the pixel value of the selected pixel. In the same manner, the relay control apparatus 30 selects also each pixel in the display section D that displays the right-eye video in the scan line order and obtains the value (rn, θn) in which the center of the selected pixel is represented by the polar coordinate system using the center of the display section D as the center. Then, the relay control apparatus 30 searches the right-eye anamorphic image data for the pixel nearest to the coordinates (rn, θn) obtained here, and in the result of the searching, sets a pixel value of the found pixel to the pixel value of the selected pixel.

Through this process, the relay control apparatus 30 fixes a pixel value of each pixel in respective display sections D that display the left-eye video and the right-eye video of the display apparatus 40 and generates the left-eye display image data and the right-eye display image data. At this time, in pixels within the anamorphic image data, as rn is smaller, density of the pixels in the peripheral direction is higher, and by contrast, as rn is larger, density of the pixels in the peripheral direction is lower (spacing between a pixel and each adjacent pixel is 2 $\pi$rn/N and becomes large in proportion to rn). Therefore, in pixel values of two pixels in positions near to the center of each display section D, respective pixel values are determined on the basis of pixels different from each other in the anamorphic image data. By contrast, in pixel values of two pixels in positions separated from the center of each display section D, respective pixel values are determined on the basis of the same pixel in the anamorphic image data. That is, there is obtained the display image data such that as a position is nearer to the center of each display section D, the resolution is higher and as a position is more separated from the center of each display section D, the resolution is lower.

The relay control apparatus 30 performs processing for correcting a distortion caused by the optical system of the display apparatus 40 on each the left-eye display image data and the right-eye display image data. Further, on the basis of each display image data after the correction, the relay control apparatus 30 generates both the left-eye video signal and the right-eye video signal of the HDMIs and outputs the video signals to the display apparatus 40. The display apparatus 40 drives the video display device 51 and displays the left-eye video and the right-eye video on the left-eye display section D and the right-eye display section D, respectively, in accordance with the video signals input from the relay control apparatus 30.

Through this process, the user views a video such that as a position is nearer to the center of each display section D, the resolution is higher and as a position is more separated from the center of each display section D, the resolution is lower. As described above, as a position is nearer to the center of each display section D at which the user gazes, the resolution is higher and therefore it is possible for the user to visually recognize a high-definition image. On the other hand, the anamorphic image data in which the resolution is reduced is transmitted to a place that is separated from the center of each display section D, and therefore the data amount to be transmitted can be reduced.

Center of Anamorphic Image Data

Meanwhile, in descriptions hitherto, the image processing apparatus 10 generates the anamorphic image data that is rearranged into an array such that as a distance from the center of each display section D is shorter, the density of the pixels is higher. However, the center of the anamorphic image data need not be the center of each display section D of the display apparatus 40. As an example, the display apparatus 40 according to the present embodiment includes a line-of-sight detection section that photographs pupils of the user who wears the display apparatus 40 and detects directions of the pupils. Further, the display apparatus 40 outputs information for specifying a position of a pixel in each display section D and a pixel C (referred to as a line-of-sight center pixel C) in the center of a line of sight of the user.

At this time, the image processing apparatus 10 may generate the anamorphic image data that is rearranged into an array such that as a distance from the line-of-sight center pixel C in each display section D specified by information output by the display apparatus 40 is shorter, the density of the pixels is higher.

Specifically, each pixel of the anamorphic image data generated by the image processing apparatus 10 of this example is obtained by mapping each pixel arrayed within the polar coordinate system onto the X and Y orthogonal coordinate system in a circle circumscribed with each display section D, which centers a position of the line-of-sight center pixel C of each display section D. Further, as N pieces of pixels are more arrayed along the θ axis on the side near to the line-of-sight center pixel C (r is small), the density of the pixels in the peripheral direction is higher. By contrast, as N pieces of pixels are more arrayed along the θ axis on the side separated from the line-of-sight center pixel C (r is large), the density of the pixels in the peripheral direction is lower.

The image generation section 21 determines the pixel value of each pixel by the rendering processing and generates the anamorphic image data. The image generation section 21 performs the processing on both the left-eye anamorphic image data and the right-eye anamorphic image data and obtains a plurality of pieces of anamorphic image data to output the anamorphic image data to the output section 22. The output section 22 receives the anamorphic image data (both the left-eye anamorphic image data and the right-eye anamorphic image data) generated by the image generation section 21 and outputs the anamorphic image data to the relay control apparatus 30.

In this case, the relay control apparatus 30 selects each pixel in each display section D of the display apparatus 40 in the scan line order and obtains a value (rn, θn) in which the center of the selected pixel is represented by the polar coordinate system using a position of the line-of-sight center image C of each display section D as the center. Then, the relay control apparatus 30 searches the anamorphic image data for the pixel nearest to the coordinates (rn, θn) obtained here, and in the result of the searching, sets a pixel value of the found pixel to the pixel value of the selected pixel to generate the display image data.

Example in Which Only Central Portion Is Generated Separately

Figure 7:
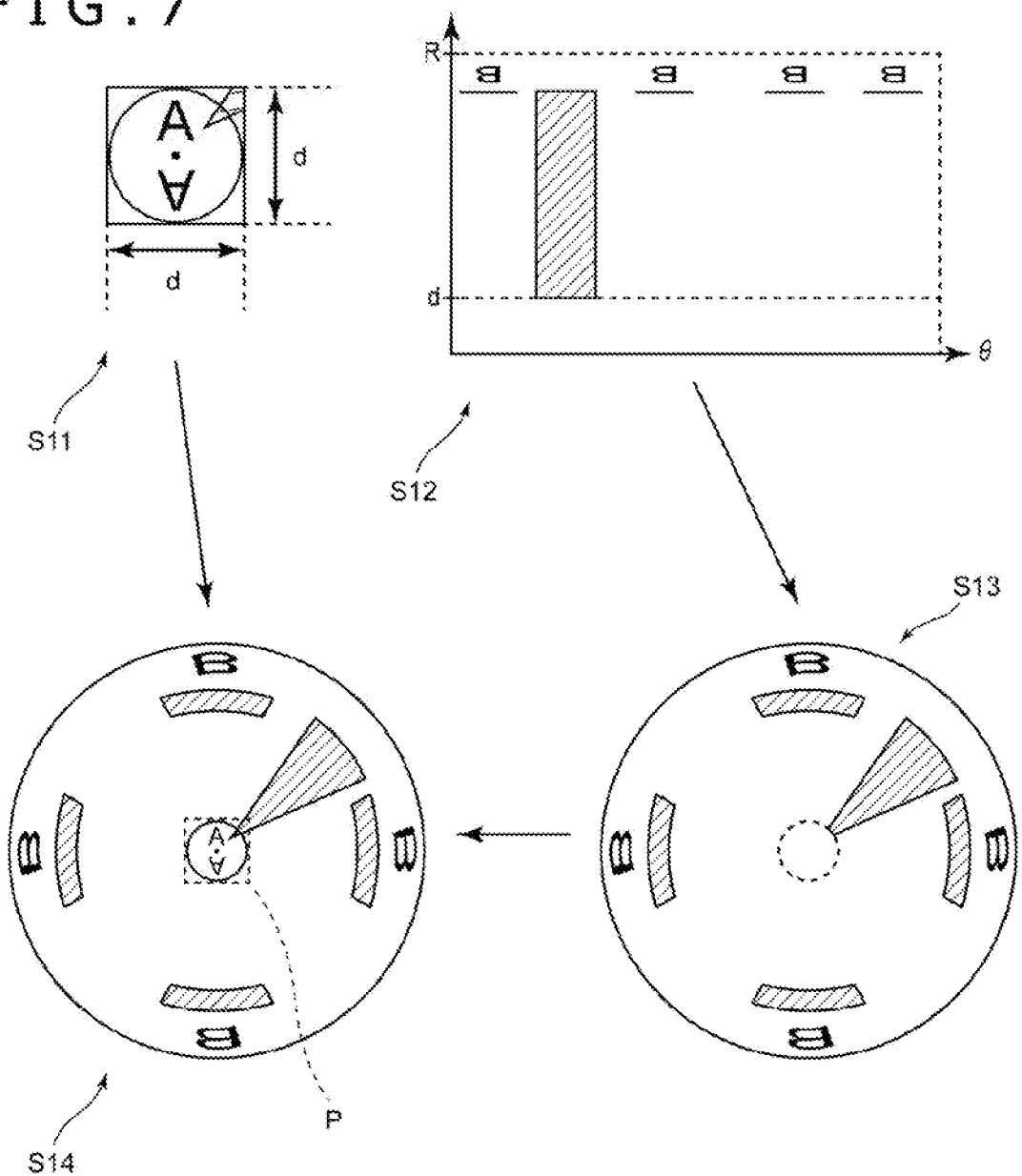
FIG. 7 is a schematic diagram illustrating another operation example of the image processing system according to the embodiment of the present invention.

Further, in an example according to the present embodiment, the image processing apparatus 10 may generate image data in the vicinity of the center of each display section D of the display apparatus 40 separately from the image data other than the central portion. In this case, the image processing apparatus 10 sets the image data outside the vicinity of the center to the above-described anamorphic image data. Specifically, in this example, as illustrated in FIG. 7, the image generation section 21 generates square-shaped partial image data (left-eye partial image data and right-eye partial image data) displayed in a square-shaped portion such that the center of each display section D and the center (point in which diagonal lines are intersected with each other) are matched with each other and a length of one side is d, as a predetermined area in each display section D by using the rendering processing (S11). In addition, the image generation section 21 generates the anamorphic image data (the left-eye anamorphic image data and the right-eye anamorphic image data) at least in a range of d≤r≤R by using the rendering processing (S12).

The image processing apparatus 10 outputs the partial image data and the anamorphic image data to the relay control apparatus 30. The relay control apparatus 30 receives the anamorphic image data supplied from the image processing apparatus 10. Then, the relay control apparatus 30 converts the anamorphic image data into image data having the pixel array within each display section D of the display apparatus 40 (S13). Then, the relay control apparatus 30 overwrites a pixel value of a pixel P corresponding to each pixel of the partial image data in each display section D by a pixel value of the pixel in the corresponding partial image data and obtains the display image data (S14), from among pixel values of the image data obtained by the conversion.

Through the processing, the relay control apparatus 30 fixes a pixel value of each pixel in respective display sections D that display the left-eye video and the right-eye video of the display apparatus 40 and generates the left-eye display image data and the right-eye display image data. At this time, in each pixel in a range of d/2 on the left, right, top and bottom from the center of each display section D, the pixel value is determined by the partial image data having (corresponding to the pixel array having a maximum resolution of each display section D) the pixel value corresponding to each pixel. In a range other than the above range, there is obtained the display image data such that as a position is nearer to the center of each display section D, the resolution is higher and as a position is more separated from the center, the resolution is lower, on the basis of the anamorphic image data.

Position of Partial Image Data

Note that even the partial image data may not be image data in the central portion of each display section D but may be image data in the range of d/2 on the left, right, top and bottom from the center of the line-of-sight center pixel C. In this example, the image processing apparatus 10 receives information for specifying a position of the line-of-sight center pixel C in each display section D from the display apparatus 40 as an instruction according to an area in each display section D to which the partial image data corresponds.

Then, the image processing apparatus 10 generates the image data in the range of d/2 on the left, right, top and bottom from the center of the line-of-sight center pixel C in each display section D of the display apparatus 40 indicated by the instruction separately from the image data other than the range. Specifically, the image processing apparatus 10 sets the image data other than the range to the above-described anamorphic image data. Specifically, in this example, as a predetermined area in each display section D, the image generation section 21 generates a square-shaped partial image data (the left-eye partial image data and the right-eye partial image data) displayed on the square-shaped portion in the range of d/2 on the left, right, top and bottom from the center of the line-of-sight center pixel C of each display section D by using the rendering processing. In addition, the image generation section 21 generates the anamorphic image data (the left-eye anamorphic image data and the right-eye anamorphic image data) at least in the range of d≤r by using the rendering processing (r is a distance from the center of the line-of-sight center pixel C).

Even in the example, the relay control apparatus 30 converts the anamorphic image data into the image data having the pixel array within each display section D of the display apparatus 40. Then, from among the pixel values of the image data obtained by the conversion, the relay control apparatus 30 overwrites a pixel value of a pixel corresponding to each pixel of the partial image data in each display section D by a pixel value of the pixel in the corresponding partial image data and obtains the display image data.

Size of Partial Image Data

Note that a size (d) of the partial image data may be varied. Specifically, when a range in the vicinity of the line-of-sight center pixel C is generated as the partial image data, the image generation section 21 may make the size (d) smaller or the like as the line-of-sight center pixel C is more separated from the center of each display section D. In addition, the size (d) may be changed in accordance with an instruction of a program of a game executed by the image processing apparatus 10.

Video from Camera

Further, in the present embodiment, the anamorphic image data is generated by the rendering processing; however, the present embodiment is not limited thereto. For example, the image processing apparatus 10 may generate the anamorphic image data on the basis of an image photographed by a camera etc. In this example, the image processing apparatus 10 may select each pixel of the anamorphic pixel array in sequence, obtain a pixel value (e.g., luminance information regarding each color in an RGB (Red, Green, Blue) color space) obtained by an image pickup device in a position corresponding to a pixel selected from the anamorphic pixel array among from the image pickup devices included in the camera, fix a pixel value of the selected pixel, and generate the anamorphic image data.

According to the example, even in the data transmission from the camera when obtaining an image, there is transmitted the image data such that as a position is nearer to the center (or a position of the line-of-sight center pixel C) of each display section D, the resolution is higher and as a position is more separated from the center (or a position of the line-of-sight center pixel C) of each display section D, the resolution is lower. Therefore, this permits the user to visually recognize a high-definition image in which the resolution is relatively high in a range in the vicinity of the center (or the line-of-sight center pixel C) of each display section D in the range at which the user gazes. On the other hand, since the resolution is reduced in a place separated from the center (or the line-of-sight center pixel C) of each display section D, the data amount to be transmitted can be reduced as a whole.

Modifications

The embodiment of the present invention hitherto described is one example; further, the present embodiment is not limited to the example here described. For example, a server that distributes image data may receive the image data to be distributed indicated by pixels arrayed in a rectangular grid pattern. Then, the server may convert at least one portion (e.g., within a circle with a predetermined radius from the center of the image data) of the received image data into the anamorphic image data indicated by pixels arrayed in the moving radius direction by a predetermined angle from a predetermined central point. Further, the server may distribute the anamorphic image data obtained by the conversion through a network. The image data here distributed is not limited to the image data of a static image and may be the image data of a moving image including a plurality of static images. When the moving image data is, for example, encoded in accordance with regulations of MPEG (Motion Picture Experts Group), only one frame (frame encoded without using an inter-frame prediction) or at least one portion of the frame may be converted into the anamorphic image data. In addition, when one portion is not converted into the anamorphic image data, the portion is encoded by using a conventional encoding method and is distributed as residual image data.

In this case, the anamorphic image data indicated by the pixels arrayed in the moving radius direction by the predetermined angle from the predetermined central point is received on the reproduction side (e.g., terminals of a personal computer etc.) in which the distributed image data is received. Then, the received anamorphic image data is converted into at least one portion of the image data indicated by the pixels arrayed in a rectangular grid pattern. Then, the image data obtained by the conversion is output. Note that, when one portion is not converted into the anamorphic image data, the residual image data received with the anamorphic image data is synthesized (using as a background the residual image data, the image data obtained here by the conversion is overwritten in a range corresponding to a portion of the image data converted into the original anamorphic image data such as the center) into the image data obtained by converting the anamorphic image data and outputs the image data after the synthesis. In this manner, the present embodiment is effectively applicable to even the distribution through the network.

Effect of Embodiment

According to the present invention, the data amount of the image data to be transmitted can be reduced while allowing the user to visually recognize a high-definition image.

REFERENCE SIGNS LIST

10 Image processing apparatus,
11 Control section,
12 storage section,
13 Interface section,
20 Operation device,
21 Image generation section,
22 Output section,
30 Relay control apparatus,
31 Control section,
32 Storage section,
33 Input/output section,
40 Display apparatus,
41 Data receiving section,
42 Conversion processing section,
43 Correction processing section,
44 Signal generation section,
51 Video display device,
52 Optical device

The invention claimed is:

1. An image processing system comprising:
a display apparatus; and
an image processing apparatus connected to the display apparatus,
wherein the image processing apparatus includes
image generation means for generating image data to be displayed and generating anamorphic image data in which each pixel of the image data displayed on the display apparatus is rearranged into an array such that as a distance from a center of a display section is shorter, density of the pixels is higher, the array being different from a pixel array in the display section of the display apparatus, and output means for outputting the generated anamorphic image data, and the display apparatus is a display apparatus that converts the anamorphic image data output by the image processing apparatus into image data having the pixel array in the display section, wherein the pixel array in the display section is a rectangular grid comprising an entirety of the display apparatus with each pixel in the pixel array in the display section having a same size.

2. The image processing apparatus according to claim 1, further comprising:

a line-of-sight detection section for detecting a line-of-sight direction of a user viewing the display apparatus, wherein a center of the anamorphic pixel array is shifted in response to the detected line-of-sight direction of the user.

3. An image processing apparatus that is connected to a display apparatus, comprising:

image generation means for generating image data to be displayed and generating anamorphic image data in which each pixel of the image data displayed on the display apparatus is rearranged into an array such that as a distance from a center of a display section is shorter, density of the pixels is higher, the array being different from a pixel array in the display section of the display apparatus; and output means for outputting the generated anamorphic image data.

4. The image processing apparatus according to claim 3, wherein the image generation means includes:

means for generating anamorphic image data in which each pixel displayed on the display apparatus is rearranged into an array such that as a distance from a center of the display section is shorter, density of the pixels is higher, the array being different from a pixel array in the display section, the anamorphic image data being obtained by arraying a pixel arrayed and displayed in an increasing radial direction in the display apparatus along a first axis in a coordinate system having the first axis and a second axis which are intersected with each other and by arraying a pixel arrayed and displayed in an angular direction in the display apparatus along the second axis in the coordinate system, and output means for outputting the generated anamorphic image data.

5. The image processing apparatus according to claim 4, wherein the coordinate system is an orthogonal coordinate system in which the first axis and the second axis are orthogonalized to each other.

6. The image processing apparatus according to claim 3, wherein the image generation means further generates partial image data displayed in a predetermined area in the display section of the display apparatus separately from the anamorphic image data, and the output means outputs the partial image data and the anamorphic image data.

7. The image processing apparatus according to claim 6, wherein the image generation means receives an instruction according to an area in the display section to which the partial image data corresponds and generates the partial image data in accordance with the received instruction.

8. An image processing apparatus comprising:

means for receiving image data indicated by a pixel arrayed in a rectangular grid pattern;

means for converting at least one portion of the received image data into anamorphic image data indicated by pixels arrayed in an increasing radial direction by a predetermined angle from a predetermined central point; and means for outputting the anamorphic image data obtained by the conversion.

9. An image processing apparatus comprising:

means for receiving anamorphic image data indicated by pixels arrayed in an increasing radial direction by a predetermined angle from a predetermined central point;

means for converting the received anamorphic image data into at least one portion of image data indicated by pixels arrayed in a rectangular grid pattern, each pixel in the rectangular grid pattern having a same size; and means for outputting the image data obtained by the conversion.

10. A non-transitory computer readable medium having stored thereon a program for an image processing apparatus that is connected to a display apparatus, the program comprising:

by image generation means, generating image data to be displayed and generating anamorphic image data in which each pixel of the image data displayed on the display apparatus is rearranged into an array such that as a distance from a center of a display section is shorter, density of the pixels is higher, the array being different from a pixel array in the display section of the display apparatus, wherein the pixel array in the display section is a rectangular grid comprising an entirety of the display apparatus with each pixel in the pixel array in the display section having a same size; and by output means, outputting the generated anamorphic image data.

* * * * *